United States Patent [19]

Fujimoto et al.

[11] Patent Number: 4,683,834

[45] Date of Patent: Aug. 4, 1987

[54] WIRE CHAIN CONNECTOR

[75] Inventors: Masashi Fujimoto; Kazuo Okazaki, both of Shimonoseki, Japan

[73] Assignee: Mitsubishi Jukogyo Kabushiki Kaisha, Tokyo, Japan

[21] Appl. No.: 830,882

[22] Filed: Feb. 19, 1986

[30] Foreign Application Priority Data

Apr. 30, 1985 [JP] Japan .................. 60-91034

[51] Int. Cl.⁴ ............................................. F16G 15/08
[52] U.S. Cl. .......................................... 114/294; 59/93
[58] Field of Search ............... 114/293, 294, 230; 59/85, 93, 95

[56] References Cited

U.S. PATENT DOCUMENTS

| | | | |
|---|---|---|---|
| 2,759,234 | 8/1956 | Brawand | 59/93 X |
| 3,842,776 | 10/1974 | Wudtke | 114/230 |
| 3,985,093 | 10/1976 | Eidem | 59/93 X |
| 4,411,132 | 10/1983 | Crook, Jr. | 59/93 X |
| 4,428,187 | 1/1984 | Bruce | 59/85 |
| 4,497,471 | 2/1985 | Longberg et al. | 254/372 |

FOREIGN PATENT DOCUMENTS

| | | |
|---|---|---|
| 543931 | 9/1922 | France . |
| 363422 | 2/1931 | United Kingdom . |
| 1486067 | 9/1977 | United Kingdom . |

*Primary Examiner*—Sherman D. Basinger
*Attorney, Agent, or Firm*—Wenderoth, Lind & Ponack

[57] ABSTRACT

A wire chain connector for an anchor line has a swivel coupled to a rope socket via a link, and a ball adapter mounted on the outer periphery of the link. A wire rope groove is formed in the inner surface of a peripheral groove in a sheave to allow a wire rope to pass along it. A chain pocket is formed in the central portion of the peripheral groove in the sheave to allow a chain to pass along it. A connector groove is formed in the outer surface of the peripheral groove in the sheave to allow the anchor line to pass along it. The body of the swivel and the ball adapter are so sized that they can be seated in the connector groove.

5 Claims, 14 Drawing Figures

FIG. 11
(PRIOR ART)
FIG. 12
(PRIOR ART)
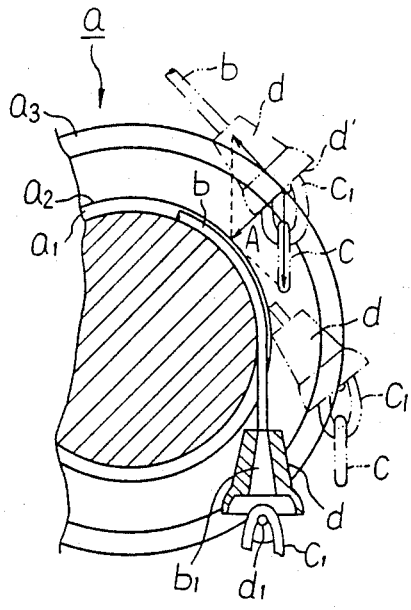
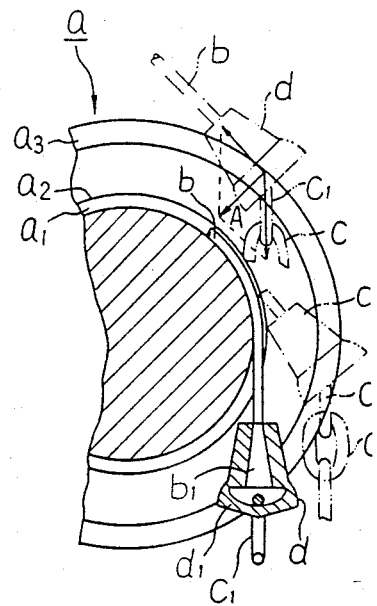
FIG. 13
(PRIOR ART)
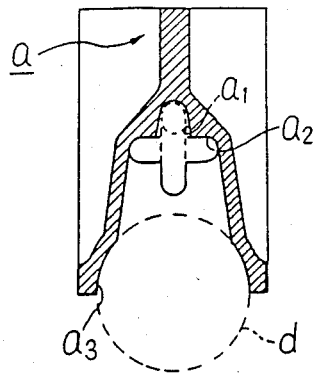
FIG. 14
(PRIOR ART)
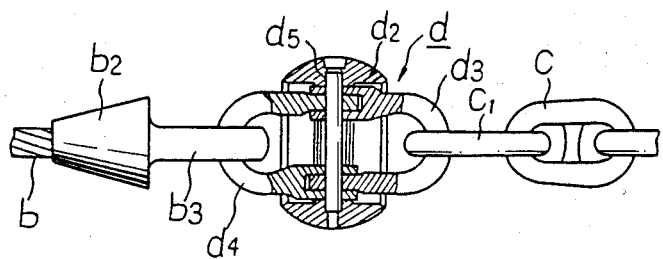

WIRE CHAIN CONNECTOR

FIELD OF THE INVENTION

The present invention relates to a wire chain connector which is used for an anchor line passing a connector groove formed in the outer surface of a sheave and which connects a wire rope to a chain that passes a chain pocket formed in the central portion of the sheave, the rope passing a wire rope groove formed in the inner surface of the sheave.

BACKGROUND OF THE INVENTION

A conventional wire chain connector for an anchor line for anchoring a rig is shown in FIGS. 11-13, where a sheave a is mounted on a rig (not shown). A wire in the rope groove $a_1$ is formed in the inner surface of the peripheral groove sheave a. A chain pocket $a_2$ is formed in the central portion of the peripheral groove in the sheave a. A connector groove $a_3$ is formed in the outer portion of the peripheral groove of the sheave a. A socket $b_1$ that has the form of a truncated cone is firmly fixed to one end of a wire rope b. The rope b is connected to a chain c by a bell-shaped wire chain connector d. An arc-shaped horizontal member $d_1$ is rigidly fixed to the larger lateral end of the connector d. The socket $b_1$ is fitted in the hollow inside of the connector d that has the form of a truncated cone, to connect the rope b with the connector d. A link $c_1$ at one end of the chain c engages the arc-shaped horizontal member $d_1$ of the connector d to connect the connector d with the chain c. An anchor (not shown) is attached to the other end of the chain c. The rope b is attached to a winch (not shown) on the rig at its other end. When the winch is driven to wind up or pay out the rope b, the rope b passes along the groove $a_1$ formed in the inner surface of the peripheral groove in the sheave a. The chain c passes along the chain pocket $a_2$ formed in the central portion of the peripheral groove of the sheave a. The wire chain connector d passes along the groove $a_3$ formed in the outer portion of the peripheral groove of the sheave a.

Another conventional wire chain connector for an anchor line is shown in FIG. 14, where a socket $b_2$ is firmly fixed to a wire rope b. A link $b_3$ is integral with the socket $b_2$. A wire chain connector d is composed of a ball adapter $d_2$, U-shaped links $d_3$ and $d_4$, and a pin $d_5$ for rotatably holding the links $d_3$ and $d_4$ to the adapter $d_2$. The link $b_3$ on the side of the rope b engages the U-shaped link $d_4$ on the side of the connector d to connect the rope b with the connector d. The link $c_1$ at one end of the chain c engages the U-shaped link $d_3$ of the connector d to connect the chain c with the link $d_3$. An anchor (not shown) is attached to the other end of the chain c. The other end of the rope is attached to the winch on the rig. When the winch is driven to wind up or pay out the rope b, the rope passes along a wire rope groove formed in the inner surface of the peripheral groove of a sheave. The chain passes along a chain pocket formed in the central portion of the peripheral groove of the sheave. The wire chain connector passes along a connector groove formed in the outer outer portion of the peripheral groove of the sheave.

The structures and the shapes of the sheave a and the wire chain connector d of the aforementioned anchor line must be so determined that when the line passes around the sheave a, no excessive force is applied to the wire rope b or the chain c; otherwise their durability would deteriorate. However, the connectors d shown in FIGS. 11-14 are unsatisfactory in this respect.

The wire chain connector d shown in FIGS. 11-13 is now discussed in more detail. When the arc-shaped horizontal member $d_1$ is located parallel to the axis of the sheave a as shown in FIG. 11 and the connector d is fitted in the connector groove $a_3$ in the sheave a, the resultant HvH of the tensions lies on the contact line between the bottom d' of the connector d and the groove $a_3$. Therefore, no rotation moment, or torque, is produced on the connector d. When the horizontal member $d_1$ is located at right angles to the axis of the sheave a as shown in FIG. 12 and the connector d is fitted in the groove $a_3$ in the sheave a, the link $c_1$ at one end of the chain c is moved to the left toward the center of the sheave a, because the horizontal member $d_1$ has an arc-shaped form. The resultant H of tensions is moved upwardly away from the contact line between the bottom d' of the connector d and the groove $a_3$. Thus, a rotation moment is generated on the connector d. As a result, a strong bending stress is produced on the wire rope b in the vicinity of the socket $b_1$. This will impair the durability of the rope b. It is to be understood that in the above description, the connector d is fitted in the groove $a_3$ in the sheave a while the horizontal member $d_1$ is located perpendicularly to the axis of the sheave a, for ease of understanding. In practice, if the horizontal member is inclined at any angle to the axis of the sheave a, then a bending stress is produced on the rope b. The shape of the connector d may be changed to prevent a bending stress from occurring on the rope b near the socket $b_1$ even if the connector d is fitted in the groove $a_3$ in the sheave a while the horizontal member $d_1$ lies perpendicularly to the axis of the sheave a. In this case, if the connector d is fitted in the groove $a_3$ in the sheave a while the horizontal member $d_1$ lies parallel to the axis of the sheave a, then a bending stress will be produced on the rope b. Also, it is difficult to change the direction of the connector d as shown in FIG. 12 to the direction shown in FIG. 11 before the connector d is fitted in the groove $a_3$ in the sheave a, because tension is applied to it, and because the sheave a may be placed below water level. Another problem arises from the fact that the connector d is shaped in the bell-shaped form and that the link $c_1$ of the chain c is mounted in the connector d via the horizontal member $d_1$. More specifically, the angle through which the anchor line is wound on the sheave a is limited to about 45°. The result is that it cannot pass a deck sheave or the like on which an anchor line must be wound at an angle of 90° to 180°.

In the case of the wire chain connector d shown in FIG. 14, the U-shaped link $d_4$ is connected to the link $b_3$ on the side of the rope b, and the U-shaped link $d_3$ is connected to the link $c_1$ at one end of the chain c. Therefore, these links are bulky, which is unfavorable for the strength. Further, since the U-shaped links $d_3$ and $d_4$ are rotatably held to the ball adapter $d_2$ via the pin $d_5$, if the adapter $d_2$ is seated in the connector groove $d_2$ in the sheave a, the adapter $d_2$ is prevented from rotating in the groove $a_3$. As a result, excessive force is applied to the sheave a.

SUMMARY OF THE INVENTION

In view of the foregoing problems, it is an object of the invention to provide an improved wire chain connector which is used for an anchor line and which prevents occurrence of a bending stress on a wire rope near a rope socket, allows a deck sheave or the like on which the line must be wound at an angle of 90 to 180° to pass the line, does not require that a chain be directed in a given direction before the chain passes over the sheave, prevents excessive force from being applied to the sheave, and facilitates uncoiling the rope and fitting the chain into a chain pocket.

This object is achieved by a wire chain connector used for an anchor line and connecting a wire rope to a chain, the anchor line passing along a connector groove formed in the outer portion of the peripheral groove in the surface of a sheave, the rope passing along a wire rope groove formed in the inner part of the peripheral groove in the sheave, the chain passing a chain pocket formed in the central portion of the peripheral groove in the sheave, the wire chain connector being characterized by the provision of a swivel connected via a link to a rope socket mounted on one end of the wire rope, the body of the swivel being so sized that it can be seated in the connector groove in the sheave and also by the provision of a ball adapter mounted on the outer periphery of the link and so sized that it can be seated in the connector groove in the sheave.

Since the wire chain connector is constructed as described above, the ball adapter makes contact with the inner wall of the connector groove on a line connecting the center of the ball adapter and the center of rotation of the sheave while the adapter is kept seated in the connector groove. Further, no bending stress is produced on the rope near the socket, because the eye of the swivel passes along the connector groove in the sheave while rotating about the center line of the body of the sheave. In addition, it allows a deck sheave or the like on which the line must be wound through an angle of 90° to 180° to pass the connector. Futhermore, it is not required that the chain be directed in a given direction before it passes. Still further, no excessive force is applied to the sheave. Since the eye of the swivel rotates about the center line of the body of the swivel, it is easy to uncoil the rope and to fit the chain into the chain pocket.

Other objects and features of the invention will appear in the course of description thereof which follows.

BRIEF DESCRIPTION OF THE DRAWINGS

FIGS. 11 and 12 are side elevations of a conventional wire chain connector;

FIG. 13 is a vertical cross section of a sheave that permits the connector shown in FIGS. 11 and 12 to pass it; and FIG. 14 is a side elevation, partly in section, of another conventional wire chain connector.

DETAILED DESCRIPTION OF THE INVENTION

Figure 1:
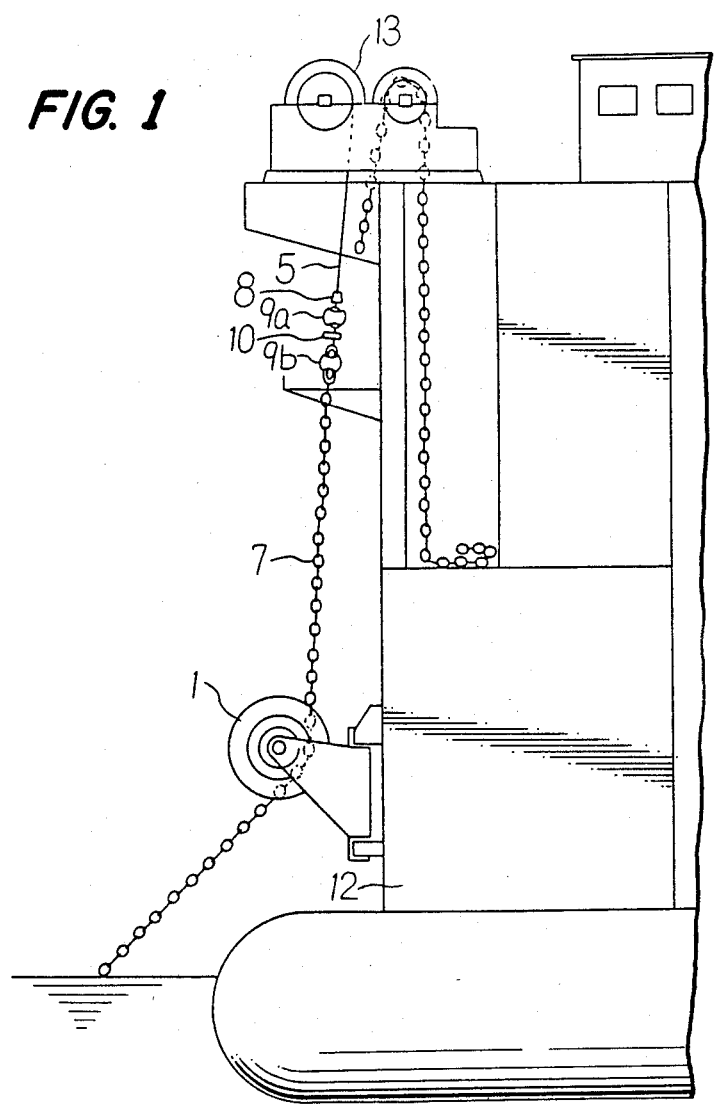
FIG. 1 is a schematic side elevation of a wire chain connector according to the invention.

A wire chain connector according to the invention is now described by referring to FIGS. 1–10. Referring first to FIG. 1, a sheave 1 is mounted on a rig 12. A wire rope 5 is connected to a chain 7 by wire chain connectors 8, 9a, 9b, and 10. A winch 13 is mounted on the rig 12.

Figure 2:
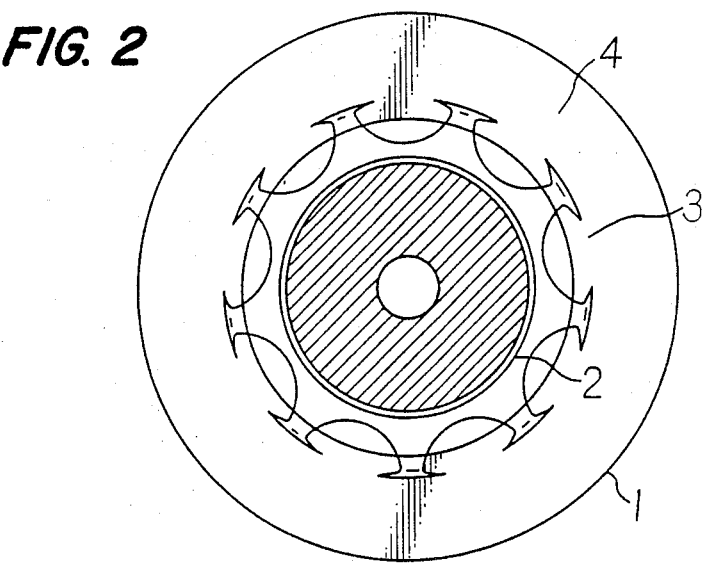
FIG. 2 is a sectional side elevation of the sheave shown in FIG. 1.
Figure 3:
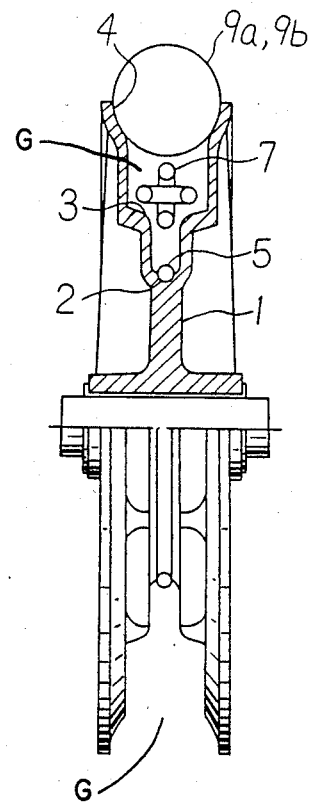
FIG. 3 is a vertical edge view partly in cross section, of the sheave shown in FIGS. 1 and 2.
Figure 4:
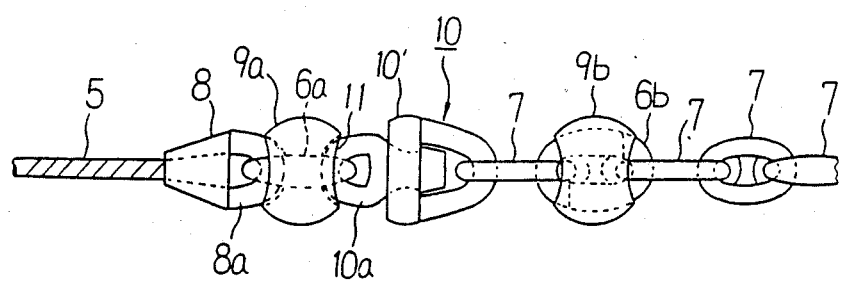
FIG. 4 is a side elevation of the wire chain connector shown in FIG. 1.
Figure 5:
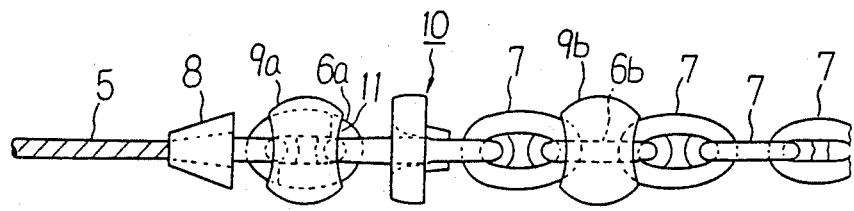
FIG. 5 is another side elevation of the connector shown in FIG. 4.

The sheave 1 is next described in detail by referring to FIGS. 2 and 3. A wire rope groove 2 is formed in the inner surface of the peripheral groove G of the sheave 1. A chain pocket 3 is formed in the central portion of the groove G in the sheave 1. A connector groove 4 is formed in the outer surface of the groove G in the sheave 1. The rope 5 passes along the groove 4. The chain 7 passes along the pocket 3. The connectors 8, 9a, 9b and 10 pass along the groove 4.

Figure 6:
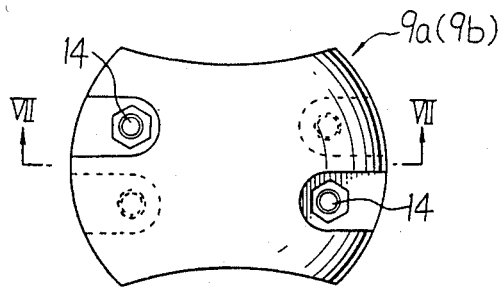
FIG. 6 is a side elevation of the ball adapter of the connector shown in FIG. 1.
Figure 7:
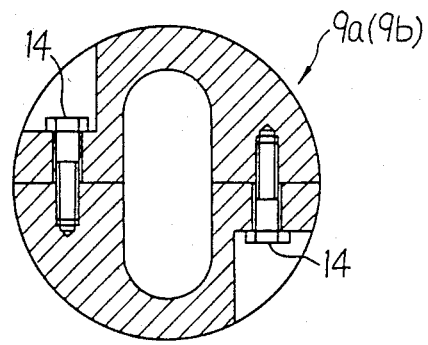
FIG. 7 is a vertical cross section taken on line VI—VI of FIG. 6.

The wire chain connectors 8, 9a, 9b and 10 are next described in detail by referring to FIGS. 4–7. A rope socket 8 is attached to one end of the wire rope 5, and has an eye 8a. A swivel is generally indicated by numeral 10, and has an eye 10a that is fitted in the body 10' of the swivel so as to be rotatable about the center line of the swivel 10. The eye 8a of the socket 8 is connected to the eye 10a of the body 10' of the swivel by a detachable link 6a. A ball adapter 9a is mounted on the outer periphery of the link 6a. A length of chain 7 engaging the swivel body 10' is connected to a neighboring length of chain 7 by a detachable link 6b. A ball adapter 9b is mounted on the outer periphery of the link 6b. The swivel body 10' and the ball adapters 9a, 9b are so sized that they can be seated in the connector groove 4 in the sheave 1. As shown in FIGS. 6 and 7, each of the ball adapters 9a and 9b consists of two halves which are connected together by bolts 14 so as to be detachable.

Figure 8:
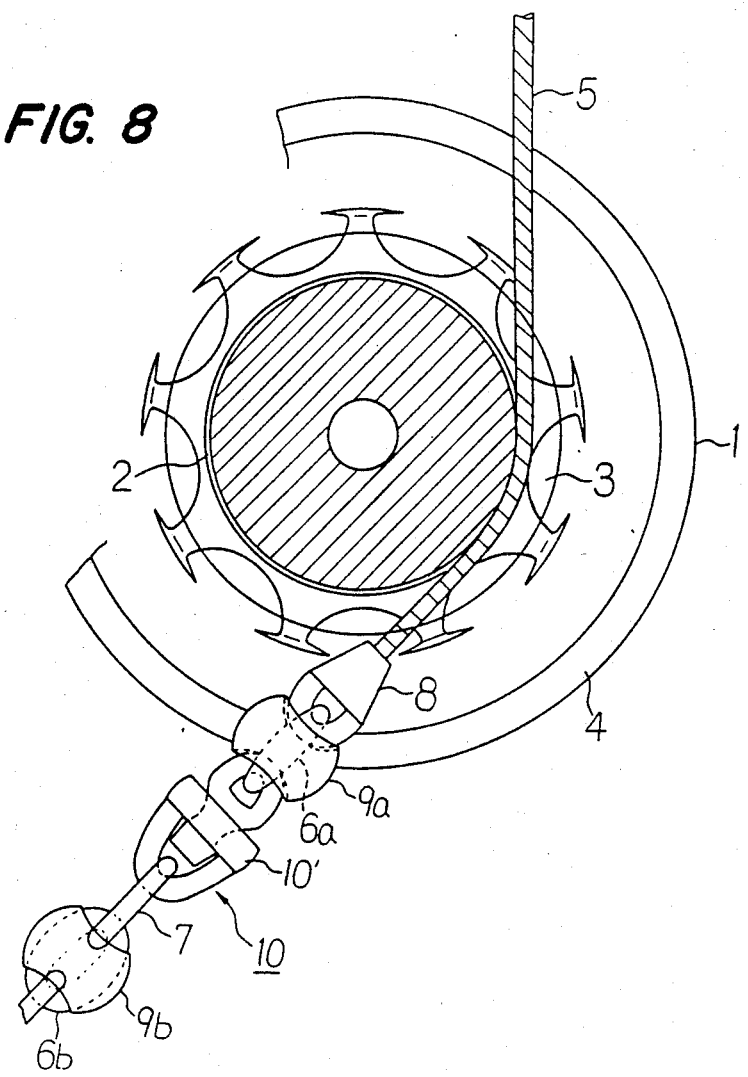
FIGS. 8, 9, 10 are views for illustrating the operation of the connector shown in FIG. 1.
Figure 9:
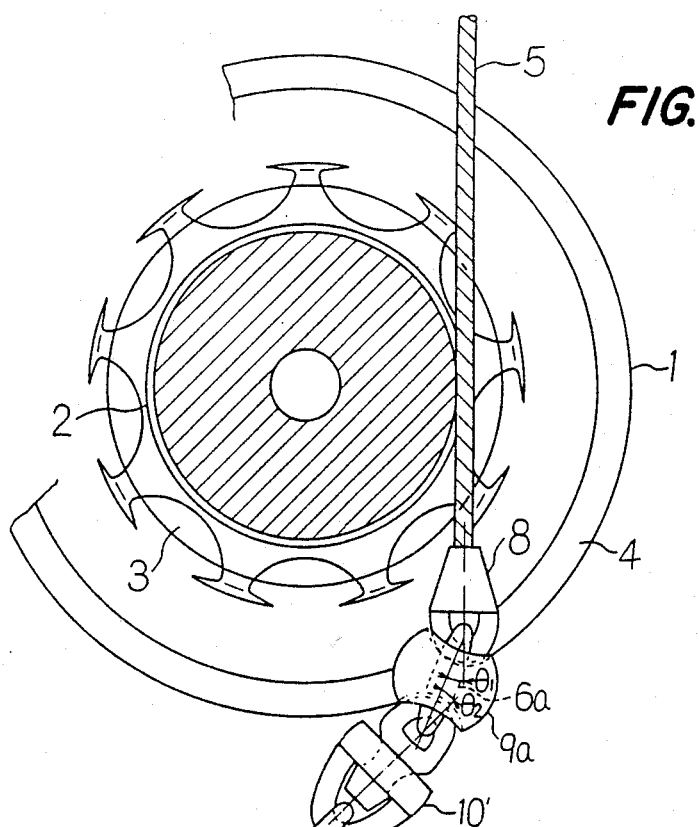
Figure 10:
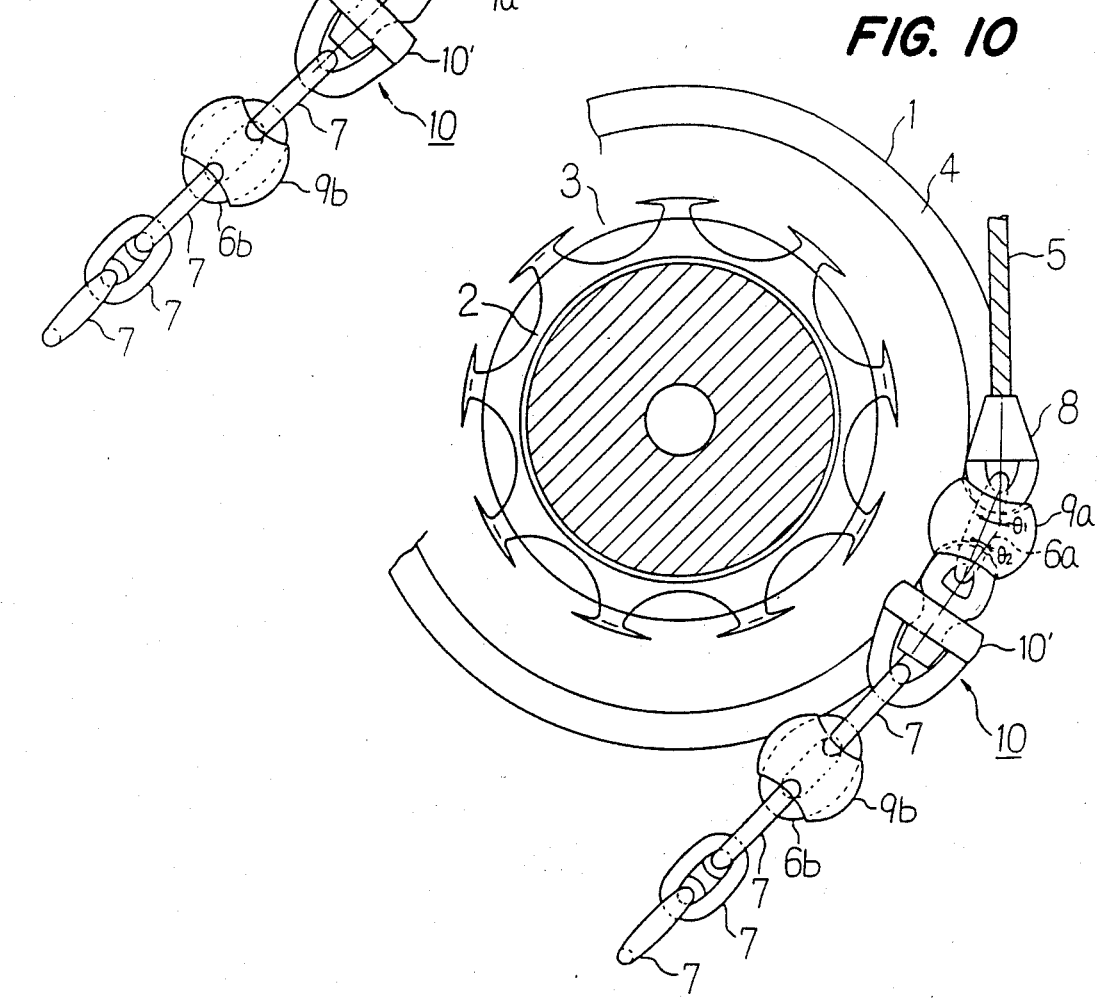

The manner in which the wire chain connectors 8, 9a, 9b and 10 work is next described by referring to FIGS. 8, 9 and 10. FIG. 8 shows the condition in which the wire rope 5 pulled upward has passed along the sheave 1 while fitting in the groove 2, the wire chain connectors 8, 9a, 9b and 10 reach the sheave 1, and the ball adapter 9a fits in the connector groove 4. The end of the rope 5 connected to the socket 8 is continued to be pulled obliquely upwardly and so the rope does not bend. Once the adapter 9a has been fitted in the groove 4 as mentioned above, as the sheave 1 turns, the adapter 9a moves and changes from the condition shown in FIG. 8 to the condition shown in FIG. 9 while fitting in the groove 4. Then, it changes to the condition shown in FIG. 10, where the body 10' of the swivel and the ball adapter 9b fit in the groove 4. Thereafter, the adapter 9a, the swivel body 10', and the adapter 9b travel while fitting in the groove 4.

After they have passed the groove 4, the chain 7 passes inside the chain pocket 3 in the sheave 1. The profiles of the adapter 9a, the swivel body 10', and the adapter 9b are shaped into convex form. The groove 4 is so shaped that its inner wall forms a portion of a sphere. The adapter 9a, the swivel body 10', and the adapter 9b are so sized that they can be seated in the groove 4. The eye 10a of the swivel 10 is fitted in the swivel body 10' so as to be rotatable about the center line of the swivel 10. The adapter 9a, the swivel body 10', and the adapter 9b pass along the connector groove 4 in the sheave 1 while acting like a universal joint. More specifically, the eye 10a of the swivel 10 and the ball adapters 9a, 9b slide inside the groove 4 in such a way that the angle $\theta_1$ formed between the socket 8 and the link 6a is equal to the angle $\theta_2$ formed between the link 6a and the swivel body 10', during the interval which begins at the instant when the adapters 9a and 9b fit into the groove 4 in the sheave 1 and ends at the instant when they come out of the groove. At this time, the adapters 9a and 9b are in contact with the inner wall of the groove 4 on the lines connecting the centers of the adapters and the center of rotation of the sheave 1. During the interval when the adapters 9a and 9b are held in the groove 4 in the sheave 1, the end of the wire rope 5 connected to the socket 8 is still pulled vertically upwardly and so it does not bend for the following reasons: (1) the profiles of the adapters 9a, 9b and of the swivel body 10' are spherical to conform to the spherical inner wall of the groove 4; (2) the socket 8 is connected via the link 6a to the swivel 10 which is connected to the chain 7 by the links 6b, and therefore the socket 8 and the chain 7 can rotate relative to each other about the center line extending longitudinally of the anchor line.

It is possible to shorten the lengths of the wire chain connectors 8, 9a, 9b and 10 by enlarging notches 11 (see FIGS. 4 and 5) formed in the adapters 9a and 9b. The provision of the swivel 10 is effective in absorbing uncoiling movement of the rope 5 which is made when less tension is applied to the anchor line. Where pieces of chain 7 neighboring the adapter 9b do not fit in the chain pocket 3, the adapter 9b guides them so as not to interfere with the pocket 3. Where they fit in the pocket 3, the adapter 9 may be dispensed with.

As described, the invention provides a wire chain connector which is used for an anchor line and which connects a wire rope to a chain, the anchor line passing along a connector groove formed in/the outer surface of a peripheral groove in the a sheave, the rope passing along a wire rope groove formed in the inner part of the peripheral groove in/the sheave, the chain passing a chain central portion of the peripheral groove in the sheave, the wire chain connector being characterized by the provision of a swivel connected via a link to a rope socket mounted on one end of the wire rope, the body of the swivel being so sized that it can be seated in the connector groove in the sheave and also by the provision of a ball adapter mounted on the outer periphery of the link and so sized that it can be seated in the connector groove in the sheave. During the interval which begins at the instant when the adapter fits into the connector groove in the sheave and ends at the instant when the adapter comes out of the groove, the adapter is in contact with the inner wall of the connector groove on the line connecting the center of the adapter and the center of rotation of the sheave. The eye of the swivel passes along the connector groove in the sheave while rotating about the center line of the body of the swivel. Therefore, the following advantages exist: (1) no bending stress is produced on the wire rope in the vicinity of the rope socket; (2) it allows a deck sheave or the like on which the line must be wound at an angle of 90° to 180° to pass the sheave; (3) it does not require that the line be directed in a given direction before the line passes the sheave; (4) no excessive force is applied to the sheave. Further, the provision of the swivel whose eye rotates about the center line of the body of the swivel facilitates uncoiling the rope and fitting the chain into the chain pocket.

It should be understood that the foregoing relates to only a preferred embodiment of the invention, and that it is intended to cover all changes and modifications of the examples of the invention herein chosen for purposes of the disclosure, which do not constitute departures from the spirit and scope of the invention.

What is claimed is:

1. A connector for an anchor line for connecting a wire rope to a chain and adapted to pass along a connector groove formed in the outer part of a peripheral groove in a sheave, the rope being adapted to pass along a wire rope groove in the inner surface of the peripheral groove of the sheave, and the chain being adapted to pass along a chain pocket formed in the central portion of the peripheral groove in the sheave, said connector comprising:
   a rope socket for mounting on one end of the wire rope;
   a chain link linked to said rope socket;
   a swivel connected to said link and having a body with a size for being seated in the connector groove in the sheave when the anchor line passes over the sheave; and
   a ball adapter mounted on the outer periphery of said link and having substantially the same size as said swivel body for being seated in the connector groove in the sheave at substantially the same radial distance from the center of said sheave as is said swivel body.

2. A connector as claimed in claim 1 wherein said swivel has an eye fitted on the body of the swivel for rotation around the longitudinal center line of the swivel which is generally in the direction of the length of the anchor line.

3. A connector as claimed in claim 1 for use with a sheave in which the connector groove has a circular cross-sectional profile and wherein said body of said swivel and said ball adapter are spherical and have substantially the same diameter as the diameter of said circular portion of the connector groove.

4. A connector as claimed in claim 1 in which said ball adapter has two halves, and bolts bolting said two halves together.

5. A connector as claimed in claim 1, further comprising a second ball adapter similar in structure to said first-mentioned ball adapter and which is mounted on the chain on the opposite side of said swivel from said first-mentioned ball adapter.

* * * * *